J. WHITE.
SOLDERING IRON.
APPLICATION FILED OCT. 17, 1912.

1,065,195.

Patented June 17, 1913.

WITNESSES

INVENTOR
James White,
ATTORNEYS

UNITED STATES PATENT OFFICE.

JAMES WHITE, OF PHILADELPHIA, PENNSYLVANIA.

SOLDERING-IRON.

1,065,195.

Specification of Letters Patent.　　Patented June 17, 1913.

Application filed October 17, 1912. Serial No. 726,241.

*To all whom it may concern:*

Be it known that I, JAMES WHITE, a citizen of the United States, and a resident of Philadelphia, in the county of Philadelphia and State of Pennsylvania, have invented a new and Improved Soldering-Iron, of which the following is a full, clear, and exact description.

This invention comprehends a new and improved soldering iron of the type adapted to hold a quantity of molten material, means being provided for supplying said material to the article or object on which work is being done.

The principal object of the invention is to provide a soldering iron made up of the usual element adapted to be heated, the element being provided with a chamber containing the solder, and also provided with a passageway between the chamber and the end of the iron, compressed air being used to insure, when so desired, the supply of solder through the said passageway to the article on which the work is being done.

Reference is to be had to the accompanying drawings forming a part of this specification, in which like characters of reference indicate corresponding parts in all the views, and in which—

Figure 1:
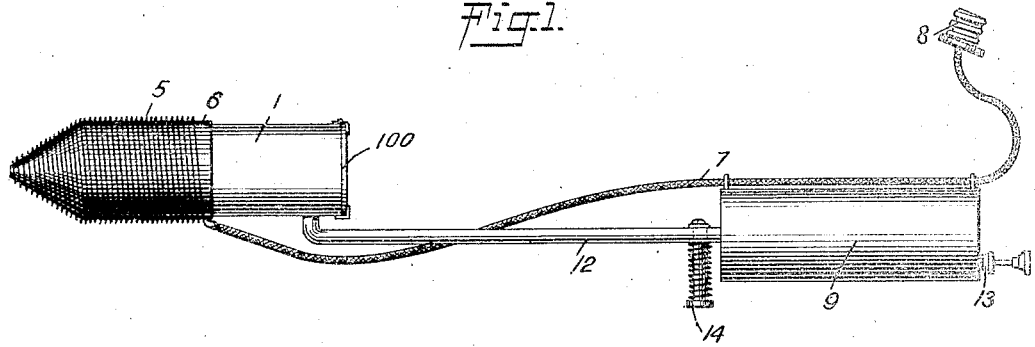
Figure 2:
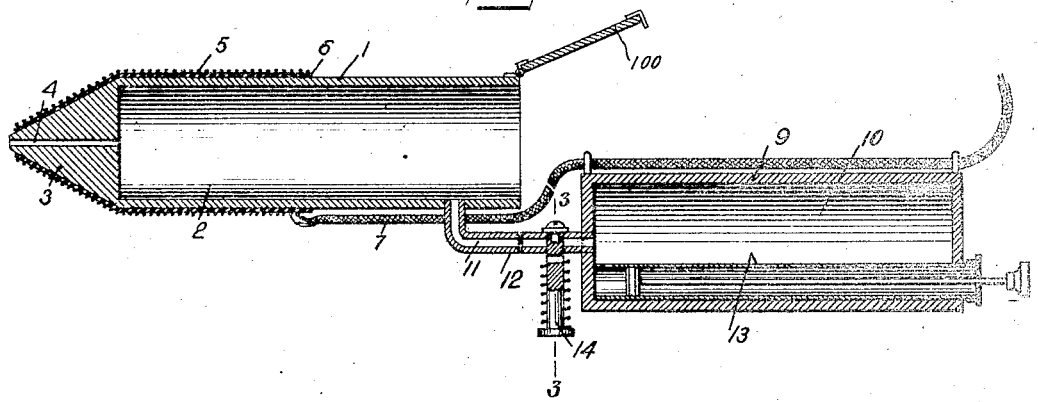
Figure 3:
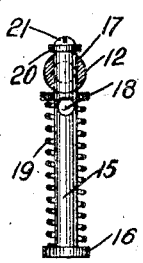

Figure 1 is a side view of the iron; Fig. 2 is a vertical sectional view thereof; while Fig. 3 is a vertical sectional view on the line 3—3 of Fig. 2.

The device herein described and claimed, which embodies a certain inventive idea, is typical merely of one form in which the invention may be comprehended, it being clear, of course, that various changes may be made in order to provide irons of varying sizes and types adapted to different uses without departing from such inventive idea.

The iron comprises the heated element 1 having a chamber 2 therein, the forward tapering end 3 being provided with a passageway 4 communicating with the said chamber; the chamber is adapted to contain a desirable amount of solder which is held in a molten condition under the influence of a heating element 5 wrapped on the element 1 in any desirable manner, and kept out of contact therewith, by means of an insulating substance 6. Power is supplied to the heating element 5 in any desired manner, the preferred form being a cord 7 having a plug 8 thereon which is adapted to be engaged with any suitable socket. The rear end of the element 1 carries a hinged cover 100 whereby the chamber 2 may be closed.

The handle 9 of the article is chambered as at 10, and is adapted to serve the purposes of an air supply, the chambers 10 and 2 communicating with each other through a suitable passageway 11 contained in the extension 12 of the handle. Within the chamber 10 in the handle is a pump 13 of any desired form, whereby the air within the chamber may be compressed, the supply to the chamber 2 in the iron being controlled by means of a valve 14, shown particularly in Fig. 3. This valve preferably comprises a spindle 15 having a button 16 at one end adapted to be engaged by the thumb or finger, the spindle extending through a suitable opening 17 in the extension 12, and being provided with an opening 18 adapted to register with the passageway 11 in the said extension when the spindle is moved, the said opening and passageway being normally maintained out of register by means of a helical spring 19 contained on the said spindle; the other end of the spindle is preferably provided with an enlarged head whereby the movement thereof is determined, preferably by providing a washer 20 on the end of the spindle held in position in any suitable manner, as by means of a screw 21.

In use the chamber 2 in the element 1 receives the necessary amount of solder and the cover is then closed; when current is provided to the heating element 5 the solder is melted, being forced through the passageway 4 in the tapered end 3 on to the article or object being soldered, this supply of solder being insured by the action of the air pressure in the chamber 10 of the handle merely by manipulation of the valve 14 in the handle extension.

The employment of this tool permits the user to keep one hand free for handling the article or object being worked on, since the solder is always available for use, the valve 14 being operable preferably by the thumb of the hand which engages the handle 9; no matter what the position of the iron, that is, whether work is being done overhead or not, the supply of solder through the passageway 4 is always maintained by reason of the said air pressure.

The provision of a supply of compressed air for forcing the molten solder to the end of the iron and onto the article which is being worked on does away with the necessity of holding a stick of unmelted solder in one hand, as is commonly done, thereby increasing the field of usefulness of the tool and at the same time providing for greater rapidity of work.

Having thus described my invention, what I claim as new and desire to secure by Letters Patent is:—

1. A soldering iron comprising a chambered element adapted to hold a quantity of solder, means for maintaining the solder in molten condition, a passageway between the chamber and the soldering end of the said element, a chambered handle communicating with the first chamber, the handle being adapted to contain a supply of compressed air, and a valve for regulating the communication between the handle and the said first chamber.

2. A soldering iron comprising a chambered element adapted to contain a quantity of solder, a heating device for maintaining the solder in molten condition, a passageway extending between the chamber and the soldering end of the said element, a handle, the handle being chambered and forming a receptacle for compressed air, a passageway between the solder-carrying chamber and the handle, and a valve for controlling communication between the interior of the handle and the said solder-carrying chamber, the pressure of the air forcing the solder through the said passageway.

3. A soldering iron comprising a chambered element adapted to hold a quantity of solder, means for maintaining the solder in molten condition, a passageway between the chamber and the soldering end of the said element, an extension carried by the said chambered element, the extension being provided with a passageway communicating with the interior of said element, the said passageway serving to conduct air pressure to the solder within the chambered element, whereby it may be forced through the first mentioned passageway.

In testimony whereof I have signed my name to this specification in the presence of two subscribing witnesses.

JAMES WHITE.

Witnesses:
 THEODORE LUTZ,
 R. H. STANWOOD.